(12) United States Patent
Koziol et al.

(10) Patent No.: US 10,562,550 B2
(45) Date of Patent: Feb. 18, 2020

(54) SLACK ADJUSTER FOR A BRAKE SYSTEM WITH INCREASED TAKE-UP CAPACITY

(71) Applicant: Westinghouse Air Brake Technologies Corporation, Wilmerding, PA (US)

(72) Inventors: Michael Anthony Koziol, Berwyn, IL (US); Scott Lee Natschke, Bourbonnais, IL (US); Peter Paul Gregar, Greenville, SC (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 83 days.

(21) Appl. No.: 15/241,141

(22) Filed: Aug. 19, 2016

(65) Prior Publication Data

US 2018/0050710 A1  Feb. 22, 2018

(51) Int. Cl.
*F16D 65/66* (2006.01)
*B61H 15/00* (2006.01)

(52) U.S. Cl.
CPC ......... *B61H 15/0057* (2013.01); *F16D 65/66* (2013.01)

(58) Field of Classification Search
CPC ............ B61H 15/0028; B61H 15/0014; B61H 15/0007; B61H 15/0057; B61H 15/00; B61H 15/0085; F16D 65/56; F16D 65/52; F16D 65/66; F16D 65/561; F16D 65/563; F16D 65/567

See application file for complete search history.

(56) References Cited

U.S. PATENT DOCUMENTS

| | | | | |
|---|---|---|---|---|
| 1,848,991 A | * | 3/1932 | Browall | B61H 15/00 188/198 |
| 1,887,586 A | * | 11/1932 | Browall | B61H 15/0057 188/196 C |
| 4,138,002 A | * | 2/1979 | Sander | B61H 15/00 188/196 D |
| 4,162,720 A | * | 7/1979 | Haraikawa | F16D 65/18 188/71.9 |

(Continued)

FOREIGN PATENT DOCUMENTS

| | | |
|---|---|---|
| WO | 2008097188 A1 | 8/2008 |
| WO | WO-2012112659 A2 * 8/2012 | ............ B60T 7/108 |
| WO | 2012174505 A1 | 12/2012 |

*Primary Examiner* — Bradley T King
*Assistant Examiner* — Stephen M Bowes
(74) *Attorney, Agent, or Firm* — Christopher R. Carroll; The Small Patent Law Group, LLC

(57) ABSTRACT

A slack adjuster for use with a railway braking system which has an increased let-out length that enables the use of brake shoes having an increased thickness. The slack adjuster includes at least one of a dual spring and canister assembly, an external yoke trigger, or a combination of both a dual spring and canister assembly and an external yoke trigger. A method of retrofitting a truck mounted brake system is provided, in which the slack adjuster is positioned within the brake system in order to increase the let-out length while maintaining a predetermined spatial envelope within the brake system. The slack adjuster has an increased let-out length enabling the use of thicker brake shoes without requiring modification of the interacting components of the truck mounted brake system since the overall size of the slack adjuster remains the same.

15 Claims, 12 Drawing Sheets

(56) References Cited

U.S. PATENT DOCUMENTS

| | | | |
|---|---|---|---|
| 4,431,089 A | * | 2/1984 | Nadas ................... F16D 65/66 |
| | | | 188/196 D |
| 4,646,882 A | | 3/1987 | Holloway et al. |
| 4,662,485 A | | 5/1987 | Kanjo et al. |
| 4,683,991 A | | 8/1987 | Kanjo |
| 7,802,662 B2 | | 9/2010 | Sommerfeld et al. |
| 2015/0001016 A1 | | 1/2015 | Whalen et al. |
| 2015/0014102 A1 | | 1/2015 | Koziol |
| 2015/0075924 A1 | | 3/2015 | Whalen et al. |
| 2016/0075353 A1 | | 3/2016 | Huber, Jr. et al. |

* cited by examiner

SLACK ADJUSTER FOR A BRAKE SYSTEM WITH INCREASED TAKE-UP CAPACITY

BACKGROUND OF THE INVENTION

Field of the Invention

The present disclosure is directed to a slack adjuster for a railway braking system, and more particularly to a slack adjuster having increased let-out capabilities than previous designs. The present disclosure is further directed to a slack adjuster that maintains the same initial spatial envelope within the braking system and still more particularly to a slack adjuster for use in a braking system, wherein the system can utilize thicker brake shoes without requiring modification of the interacting components of the braking system since the initial overall size of the slack adjuster remains the same.

Description of Related Art

Slack adjusters are widely used in brake systems in the railway industry to adjust the brakes and to automatically compensate for slack in the brake rigging, which occurs after repeated brake applications. Slack can be caused by component wear in the brake rigging, brake shoe wear, wheel wear, and the like. One example of a brake system that uses a slack adjuster is a truck mounted brake system. Truck mounted braking systems are well-known in the railway industry and typically comprise a series of force transmitting members, levers, and linkages which function to move a group of brake shoes against the wheels of a railway vehicle to effect stoppage of the railway vehicle. Examples of truck mounted brake systems include Applicant's TMX® or UBX® systems, where two brake beams are provided per truck to provide the braking force to the two axles of the truck. The two brake beams are activated by at least one brake cylinder that is in fluid communication with a source of compressed air, such as an air reservoir mounted on the body of the railway vehicle.

In general, each brake beam includes a compression beam having its terminal ends coupled to the ends of a V-shaped tension beam. A brake head is provided at the opposing terminal ends of the compression beam and/or the V-shaped tension beam. Each brake head includes a brake shoe carrier adapted to receive a removable brake shoe. The brake mechanism is coupled to the truck of the railway vehicle at end portions of the brake heads.

The force-transmitting levers are pivotally connected to each brake beam at its midpoint and utilize lever arms for connection to the force-transmitting members. One of the force-transmitting members is a slack adjuster device, the other force-transmitting member includes a pneumatically actuated brake cylinder device, the body of which is mounted on a first brake beam between the beam tension and compression members adjacent the strut bar, and a connecting rod disposed intermediate the transfer lever arm of a second brake beam and the cylinder body.

The brake cylinder piston push rod is connected to the transfer lever arm of the first brake beam. The cylinder initiates movement of this series of force transmitting members, levers, and linkages to apply the brake of the railway vehicle mounted to the truck assembly of the railway vehicle.

As the brake shoes wear down, the slack adjuster increases in length in order to maintain the correct slack through the use of an actuator control rod or control lever so that the shoes are able to apply sufficient force to the wheels. It can be appreciated that an overall length/envelope size of a slack adjuster can be varied in accordance with the application and/or type of braking system in which it is being used. One currently used slack adjuster, which is used in truck mounted brake systems, is only capable of taking up slack generated by wear of the wheels and brake shoes wherein the brake shoes have a thickness of approximately 2 inches (52 mm) before the shoes reach their respective condemning limits. Anything past this condition renders the slack adjuster ineffective. As the 2 inch (52 mm) brake shoes wear down, it becomes necessary to replace the brake shoes. The use of thicker brake shoes, such as 3 inch (76 mm) brake shoes, would be desirable as it would increase the amount of time or number of braking applications that can occur before it becomes necessary to replace the brake shoes.

The capability or wear the slack adjuster can compensate for is directly related to the ratio of levers and let-out capabilities of the slack adjuster. Current systems cannot utilize these thicker brake shoes without increasing the initial overall length/envelope size of the slack adjuster. This increase in length would require manually adjusting the lever ratios and/or redesigning the interacting parts of the truck mounted brake system. Thus, there is a need in the art for a slack adjuster which has the same initial overall length/envelope size than the slack adjusters currently in use, but allows a braking system to use thicker brake shoes, such as shoes greater than 2 inches thick, for example, 3 inch (76 mm) brake shoes or even thicker. The use of a slack adjuster having the same initial spatial envelope than previous or currently used designs, but wherein thicker brake shoes could be used, would eliminate the need to adjust and/or change the interacting components of the brake system.

SUMMARY OF THE INVENTION

In accordance with an embodiment of the present disclosure, a slack adjuster for a railway braking system is provided that has greater let-out capabilities than previous designs. The slack adjuster includes at least one of a dual spring and canister assembly; and an external yoke trigger, wherein at least one of the dual spring and canister assembly and the external yoke trigger increase a let-out length of the slack adjuster. The slack adjuster having the greater let-out capabilities can be designed so that it maintains the same initial spatial envelope as the previous designs that had the smaller let-out capabilities. According to one embodiment, the slack adjuster has a let-out length that is sufficient to accommodate the use of brake shoes having a thickness ≥2.01 inches. According to another embodiment, the slack adjuster includes both the dual spring and canister assembly and the external yoke trigger.

In accordance with another embodiment of the present disclosure, a railway braking system includes a pair of brake beams mounted at each end of the brake system, each of the brake beams including a compression beam, a tension beam, and a strut secured between the compression beam and tension beam. The braking system further includes a brake head attached to opposing terminal ends of each end of the brake beams, each of the brake heads carrying a brake shoe thereon, wherein each of the brake shoes are positioned for engagement with a respective railway vehicle wheel during a brake application, a pair of force transfer members pivotally connected to the struts of the pair of brake beams, a rod and a brake cylinder interconnecting a first end of the pair of force transfer members, and a slack adjuster interconnecting a second end of the pair of force transfer members. The slack adjuster includes at least one of a dual spring and canister assembly and an external yoke trigger, wherein at least one of the dual spring and canister assembly and the external yoke trigger increase a let-out length of the slack adjuster.

The slack adjuster can include the external yoke trigger and further include an overtravel control rod located within an overtravel housing and wherein the external yoke trigger is configured to cooperate with the overtravel control rod. The external yoke trigger can be secured to the slack adjuster by at least one clamp located outside of the overtravel housing. The at least one clamp can encircle an outer surface of at least one of the overtravel control rod and the overtravel housing and the at least one clamp can include a pair of clamps. A trigger ring can be provided which encircles a portion of the overtravel control rod and cooperates with the external yoke trigger to secure the overtravel control rod within the slack adjuster. According to one embodiment, the overtravel control rod can be hollow from one end to an opposite end. The trigger can be associated with a control rod and a control rod nut and the overtravel control rod, trigger, control rod, and control rod nut can cooperate together to measure an amount of let-out or take-up of slack for each brake application.

The dual spring and canister assembly of the slack adjuster can include an inner spring, a canister, and an outer spring located within a main spring housing of the slack adjuster. The inner spring can nest within the outer spring such that the inner and outer spring function in series to increase a let-out length of a main rod of the slack adjuster. According to one embodiment, the slack adjuster can have a let-out length which is sufficient to accommodate the use of brake shoes having a thickness $\geq 2.01$ inches. The slack adjuster can be a second slack adjuster that can be retrofitted into the braking system by replacing a first slack adjuster and wherein a fully extended length of the second slack adjuster can be determined by the following equations: $SA1_C=X$; $SA1_E=X+Y$; $SA2_C=X$; $SA2_E=X+Z$; $SA1_C=X=SA2_C$; and $Z>Y$ where, $SA1_C$ is the compressed length of the first slack adjuster; SALE is the fully extended length of the first slack adjuster; X is the compressed length of both the first and second slack adjuster; Y is the extension amount of the first slack adjuster; $SA2_C$ is the compressed length of the second slack adjuster; $SA2_E$ is the fully extended length of the second slack adjuster; and Z is the extension amount of the second slack adjuster.

It can be appreciated that the slack adjuster can have both the external trigger and the dual spring and canister assembly, which allows one to maintain a predetermined spatial envelope without requiring any change to the interacting components of the braking system because the compressed size of the slack adjuster remains unchanged. It can also be appreciated that the slack adjuster can include either one of the external trigger or the dual spring and canister assembly of the present disclosure, which would result in the capability of more let-out of the slack adjuster, but may require a change to the overall size of the slack adjuster.

In accordance with yet another embodiment of the present disclosure, a method of retrofitting a braking system in order to increase the let-out length while maintaining a predetermined spatial envelope includes providing a slack adjuster having at least one of a dual spring and canister assembly and an external yoke trigger, wherein at least one of the dual spring and canister assembly and the external yoke trigger increases a let-out length of the slack adjuster. According to one embodiment, the slack adjuster can have a let-out length that is sufficient to accommodate the use of brake shoes having a thickness $\geq 2.01$ inches. The brake system includes a series of levers arranged according to a predetermined ratio and wherein the slack adjuster is placed within the brake system while maintaining the predetermined lever ratio. The slack adjuster can include a dual spring and canister assembly located within a main spring housing of the slack adjuster and wherein the dual spring and canister assembly function in series to increase the slack adjuster let-out length. The slack adjuster can also include an overtravel control rod located within an overtravel housing and an external yoke trigger configured to cooperate with the overtravel control rod. The method can further include the steps of replacing a first slack adjuster having a compressed length of X and a fully extended length of X+Y with a second slack adjuster having the compressed length of X and a fully extended length of X+Z, and wherein Z>Y.

Further preferred and non-limiting embodiments or aspects will now be described in the following number clauses.

Clause 1: A slack adjuster for a railway braking system, said slack adjuster including at least one of a dual spring and canister assembly; and an external yoke trigger, wherein at least one of the dual spring and canister assembly and the external yoke trigger increase a let-out length of the slack adjuster.

Clause 2: The slack adjuster according to clause 1, wherein the slack adjuster has a let-out length that is sufficient to accommodate the use of brake shoes having a thickness $\geq 2.01$ inches.

Clause 3: The slack adjuster according to clauses 1 or 2, wherein the slack adjuster includes both the dual spring and canister assembly and the external yoke trigger.

Clause 4: A railway braking system comprising: a pair of brake beams mounted at each end of the brake system, each of the brake beams including a compression beam, a tension beam, and a strut secured between the compression beam and tension beam; a brake head attached to opposing terminal ends of each end of the brake beams, each of the brake heads carrying a brake shoe thereon, wherein each of the brake shoes are positioned for engagement with a respective railway vehicle wheel during a brake application; a pair of force transfer members pivotally connected to the struts of the pair of brake beams; a rod and a brake cylinder interconnecting a first end of the pair of force transfer members; and a slack adjuster interconnecting a second end of the pair of force transfer members, wherein the slack adjuster includes: at least one of a dual spring and canister assembly; and an external yoke trigger, wherein at least one of the dual spring and canister assembly and the external yoke trigger increase a let-out length of the slack adjuster.

Clause 5: The railway braking system according to clause 4, wherein the slack adjuster includes the external yoke trigger and the slack adjuster further includes an overtravel control rod located within an overtravel housing and wherein the external yoke trigger is configured to cooperate with the overtravel control rod.

Clause 6: The railway braking system according to clauses 4 or 5, wherein the external yoke trigger is secured to the slack adjuster by at least one clamp located outside of the overtravel housing.

Clause 7: The railway braking system according to clause 6, wherein the at least one clamp encircles an outer surface of at least one of the overtravel control rod and the overtravel housing.

Clause 8: The railway braking system according to clauses 6 or 7, wherein the at least one clamp comprises a pair of clamps.

Clause 9: The railway braking system according to any of clauses 5-8, including a trigger ring encircling a portion of the overtravel control rod and cooperating with the external yoke trigger to secure the overtravel control rod within the slack adjuster.

Clause 10: The railway braking system according to any of clauses 5-9, wherein the overtravel control rod is hollow from one end to an opposite end.

Clause 11: The railway braking system according to any of clauses 5-10, wherein the trigger is associated with a control rod and a control rod nut and wherein the overtravel control rod, trigger, control rod, and control rod nut cooperate together to measure an amount of let-out or take-up of slack for each brake application.

Clause 12: The railway braking system according to clause 4, wherein the slack adjuster includes the dual spring and canister assembly and wherein the dual spring and canister assembly comprises an inner spring, a canister, and an outer spring located within a main spring housing of the slack adjuster.

Clause 13: The railway braking system according to clause 12, wherein the inner spring nests within the outer spring such that the inner and outer spring function in series to increase a let-out length of a min rod of the slack adjuster.

Clause 14: The railway braking system according to any of clauses 4-13, wherein the slack adjuster has a let-out length that is sufficient to accommodate the use of brake shoes having a thickness ≥2.01 inches.

Clause 15: The railway braking system according to any of clauses 4-14, wherein the slack adjuster includes both the dual spring and canister assembly and the external yoke trigger.

Clause 16: The railway braking system according to any of clauses 4-15, wherein the slack adjuster comprises a second slack adjuster that can be retrofitted into the braking system by replacing a first slack adjuster and wherein a fully extended length of the second slack adjuster is determined by the following equations: SA1C=X; SA1E=X+Y; SA2C=X; SA2E=X+Z; SA1C=X=SA2C; and Z>Y where, SA1C is the compressed length of the first slack adjuster; SA1E is the fully extended length of the first slack adjuster; X is the compressed length of both of the first and second slack adjuster; Y is the extension amount of the first slack adjuster; SA2C is the compressed length of the second slack adjuster; SA2E is the fully extended length of the second slack adjuster; and Z is the extension amount of the second slack adjuster.

Clause 17: A method of retrofitting a braking system in order to increase the let-out length while maintaining a predetermined spatial envelope, said method comprising providing a slack adjuster having at least one of a dual spring and canister assembly and an external yoke trigger, wherein at least one of the dual spring and canister assembly and the external yoke trigger increases a let-out length of the slack adjuster.

Clause 18: The method according to clause 17, wherein the slack adjuster has a let-out length that is sufficient to accommodate the use of brake shoes having a thickness ≥2.01 inches.

Clause 19: The railway braking system according to any of clauses 17-18, wherein the slack adjuster includes both the dual spring and canister assembly and an external yoke trigger.

Clause 20: The method according to any of clauses 17-19, wherein the brake system includes a series of levers arranged according to a predetermined ratio and wherein the slack adjuster is placed within the brake system while maintaining the predetermined lever ratio.

Clause 21: The method according to any of clauses 17-20, wherein the slack adjuster includes a dual spring and canister assembly located within a main spring housing of the slack adjuster and wherein the dual spring and canister assembly function in series to increase the slack adjuster let-out length.

Clause 22: The method according to any of clauses 17-21, wherein the slack adjuster includes the external yoke trigger and the slack adjuster further includes an overtravel control rod located within an overtravel housing and wherein the external yoke trigger is configured to cooperate with the overtravel control rod.

Clause 23: The method according to any of clauses 17-22, comprising replacing a first slack adjuster having a compressed length of X and a fully extended length of X+Y with a second slack adjuster having the compressed length of X and a fully extended length of X+Z, and wherein Z>Y.

These and other features and characteristics of the slack adjuster for use in a truck mounted brake system, resulting in greater let-out capabilities than previous designs while maintaining the same initial spatial envelope enabling the use of thicker brake shoes in the braking system, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

BRIEF DESCRIPTION OF THE DRAWING(S)

DESCRIPTION OF THE INVENTION

Figure 1:
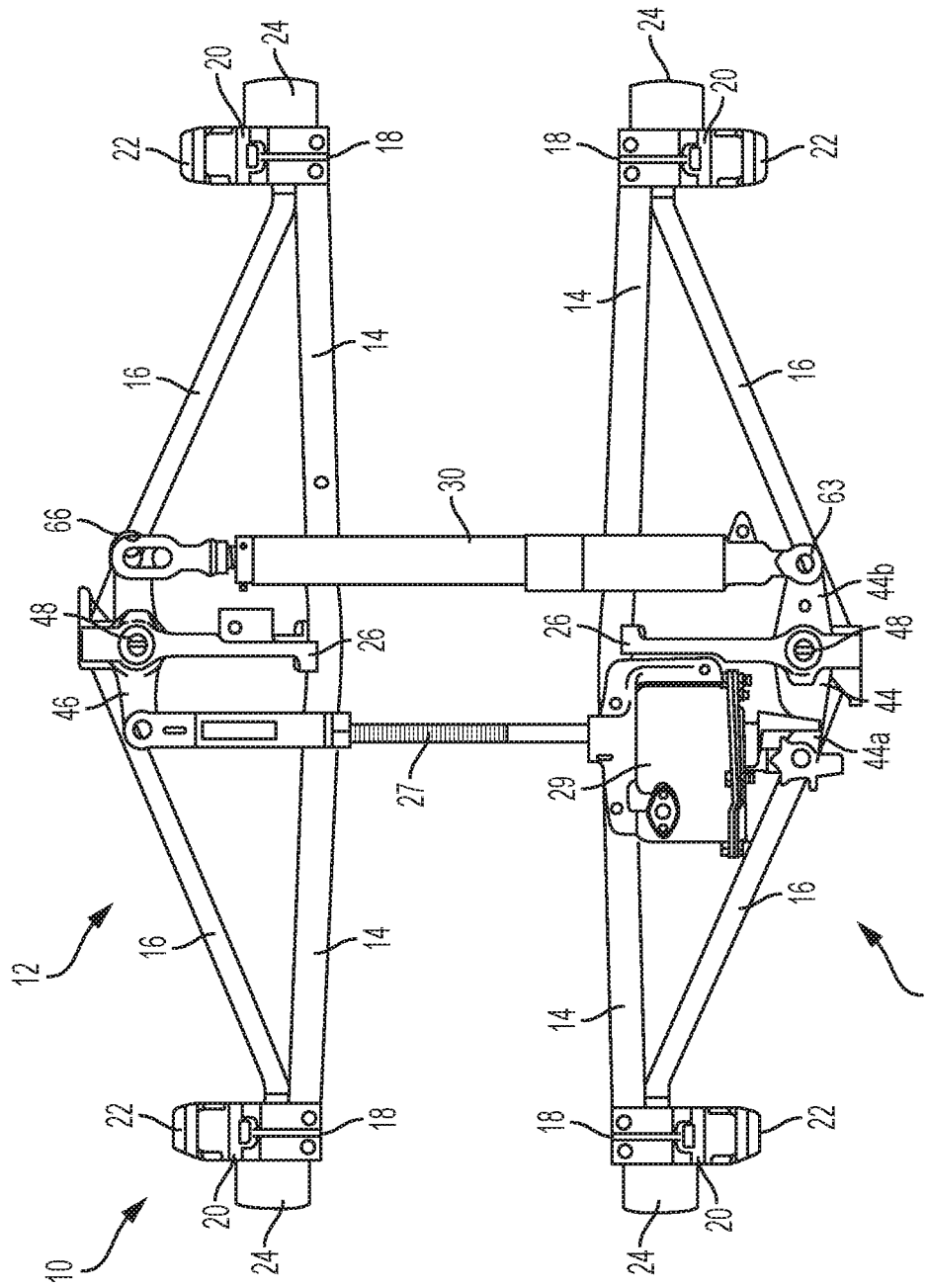
FIG. 1 is a top view of a truck mounted brake assembly in accordance with the prior art.

For purposes of the description hereinafter, the terms "upper", "lower", "right", "left", "vertical", "horizontal", "top", "bottom", "lateral", "longitudinal", and derivatives thereof, shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to the drawings in which like reference characters refer to like parts throughout the several views thereof, the present disclosure is generally directed to a slack adjuster having greater let-out capabilities than previous designs while maintaining the same initial spatial envelope within the braking system.

Reference is now made to FIG. 1, which shows a truck-mounted brake assembly, generally indicated as 10, which is commonly used in the art. The brake mechanism 10, as described herein, is intended for connection to a truck of a railway vehicle (not shown), as will be readily apparent to those skilled in the railway vehicle art. The brake mechanism 10 is adapted for use in railway vehicles adapted for passenger and/or cargo transit. However, this use is intended to be non-limiting and the brake mechanism 10 has applications in railway vehicles generally.

With continuing reference to FIG. 1, the brake mechanism 10 includes a pair of brake beams, generally indicated as 12, which are substantially identical. Each of the brake beams 12 include a compression beam 14, a generally V-shaped tension beam 16, and a strut 26. The terminal ends of the compression beam 14 are coupled to the corresponding terminal ends of the tension beam 16. At a location substantially midway between their opposite ends, the compression beam 14 and the tension beam 16 of the respective brake beams 12 are spaced apart sufficiently to allow connection of the strut 26 therebetween.

A brake head 18 is provided at the opposing terminal ends of the compression beam 14 and/or the tension beam 16. Each brake head 18 includes a brake shoe carrier 20 adapted to receive a removable brake shoe 22. The brake mechanism 10 is coupled to the truck of the railway vehicle (not shown) at end portions or brake head extensions 24 extending from a side portion of the brake heads 18. The brake head extensions 24 cooperate with unit guides located within the truck side frames. In operation, the compression beam 14 and the tension beam 16 hang from the side frames of the truck.

With continuing reference to FIG. 1, the brake mechanism 10 further includes a pair of force transmitting levers 44, 46 pivotally connected by pins 48 to the strut member 26 of the respective brake beam 12. The force transmitting members 44, 46 are interconnected by a rod 27 and an automatic compression slack adjuster 30. As shown in FIG. 1, the rod 27 also connects a brake cylinder 29 to one end 44a of the force transmitting lever 44 for transferring the braking force exerted by the brake cylinder to the brake beam 12. The automatic compression slack adjuster 30 includes a front jaw that is attached to the opposing end 44b of the force transmitting lever 44 and a rear jaw 66 attached to the force transmitting member 46 wherein the slack adjuster 30 automatically extends and moves the brake heads 18 closer to the wheels of the railway vehicle in order to compensate for wear of the brake shoes 22.

Figure 2A:
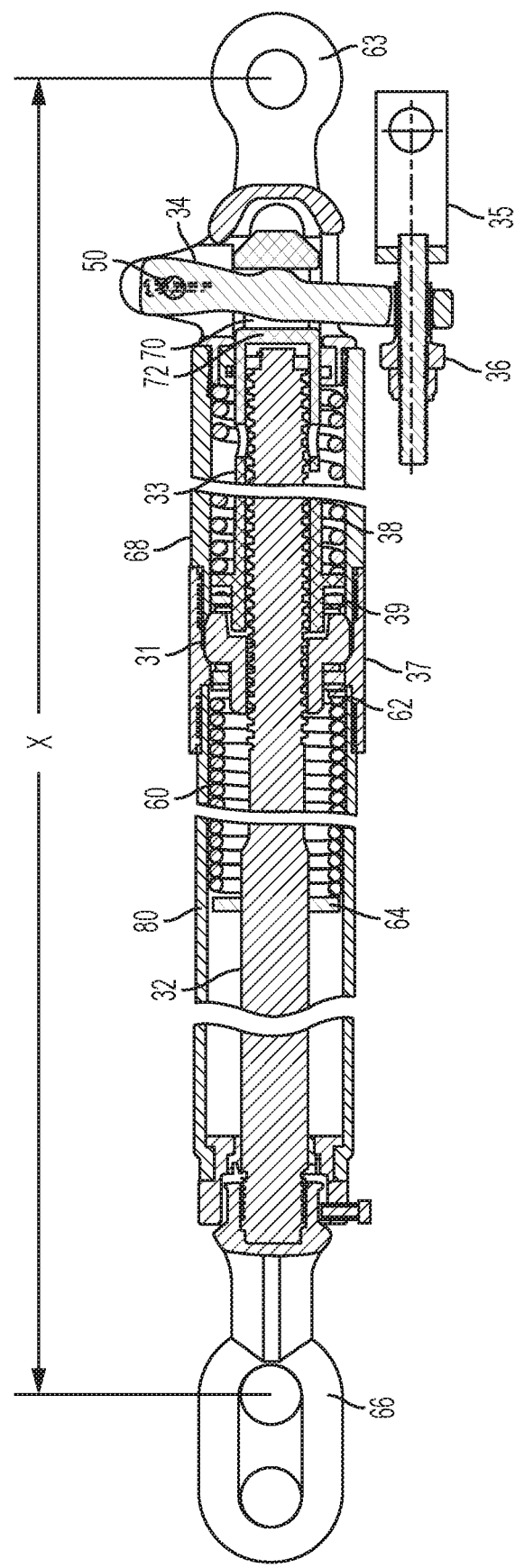
FIG. 2A is a cross-sectional view of a slack adjuster in a compressed condition in accordance with the prior art.
Figure 2B:
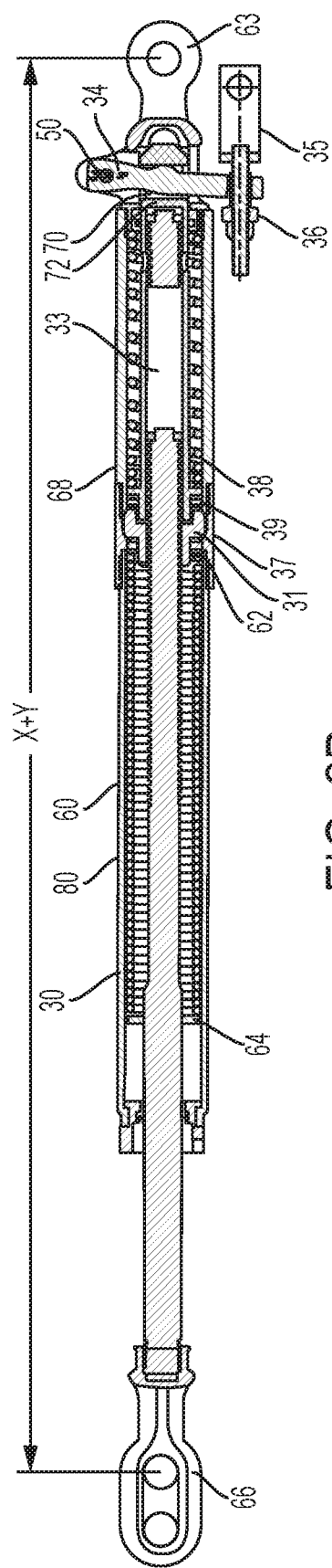
FIG. 2B is a cross-sectional view of a slack adjuster in a fully expanded condition in accordance with the prior art.

Reference is now made to FIGS. 2A and 2B, which show cross-sectional views of the compression slack adjuster 30 of FIG. 1, in compressed and fully extended conditions, respectively, in accordance with the prior art. It can be appreciated that the slack adjuster 30 can have a compressed length or overall envelope size "X" that can vary depending upon the application and/or type of braking system being used. The envelope size of the prior art slack adjuster in the compressed condition can be defined by the following equation: $SA1_C=X$, where $SA1_C$ is the prior art slack adjuster or a first slack adjuster in the compressed condition and X is the compressed length of the slack adjuster. The compression slack adjuster 30 includes a cone lock nut 31, which rotates over a non-rotating threaded rod assembly or main rod 32. The slack adjuster 30 automatically extends in length to take up slack that occurs due to wear of the brake shoes 22 during use of the braking mechanism 10 so that the shoes are able to apply sufficient force to the wheels. In other words, the slack adjuster 30 is capable of taking up slack generated by a reduction in thickness of the brake shoes 22 due to friction between the brake shoes 22 and the wheels causing a reduction in the thickness of the brake shoes 22 and/or wear of the wheels, and/or due to wear of the brake rigging itself that occurs after repeated brake applications. In one currently used example, the brake shoes can have a thickness up to 2 inches (52 mm) and the slack adjuster is capable of taking up the slack caused by wear of these 2 inch (52 mm) shoes and wear caused to the wheels before the slack adjuster 30 becomes ineffective. The slack adjuster 30 in its fully extended condition "X+Y" is shown in FIG. 2B, where "Y" denotes the full extension amount of the slack adjuster. Accordingly, the length of the slack adjuster of the prior art in the fully extended condition can be defined by the following equation: $SA1_E=X+Y$, where $SA1_E$ is the prior art slack adjuster or the first slack adjuster in the fully extended position; X is the compressed length of the slack adjuster; and Y is the extension amount of the slack adjuster. The amount of let-out or taking up of slack is measured on each brake application by the control mechanism that comprises the overtravel control rod 33, the trigger 34, the control rod 35, and the control rod nut 36. When the brakes are released, the control rod 35 is positioned away from the trigger 34. The cone lock nut 31, which governs the length of the slack adjuster 30, is frictionally locked against the cone nut housing 37 by the force of the overtravel spring 38.

With continuing reference to FIGS. 2A and 2B, while referring back to FIG. 1, as the brakes are applied, the cylinder push rod 27 and control rod 35, which are connected to the opposing end 44b of the force transmitting lever 44, extend. Prior to the brake shoes 22 making contact with the wheels, the control rod 35 causes the control rod nut 36 to contact the trigger 34. As piston travel increases, the trigger 34 fulcrums about the trigger pin 50. This compresses the overtravel spring 38 and moves the overtravel control rod 33 away from the bearing assembly 39 and cone lock nut 31. The compression of the overtravel spring 38 releases the load that frictionally locks the cone lock nut 31 to the cone nut housing 37. The cone lock nut 31 is now unlocked and free to rotate over the threads of the main rod assembly 32. The load from the main spring 60, located within the main spring housing 80, is compressed between the overtravel spring seat 62 and the washer 64 of the rod assembly 32 extends the rod assembly 32. The main rod assembly 32 will extend until the brake shoes contact the wheels. Piston travel continues to increase until the load on the main rod assembly 32, through the transfer lever 46 and rear jaw 66, becomes greater than the force of the main spring 60 and moves the cone lock nut 31 laterally, which frictionally locks it with the overtravel housing 68 and prevents any further taking-up of slack. At this point, the brakes are fully applied and the present piston travel will be obtained.

As the brakes release, the piston rod retracts and removes the force on the control rod 35. With the release of this force, the trigger 34 is once again free to fulcrum about the trigger pin 50. At this point, the overtravel spring 38 is the dominant force and moves the cone lock nut 31 laterally off of the overtravel housing 68 and returns it to its release position frictionally locked against the cone nut housing 37.

Figure 3:
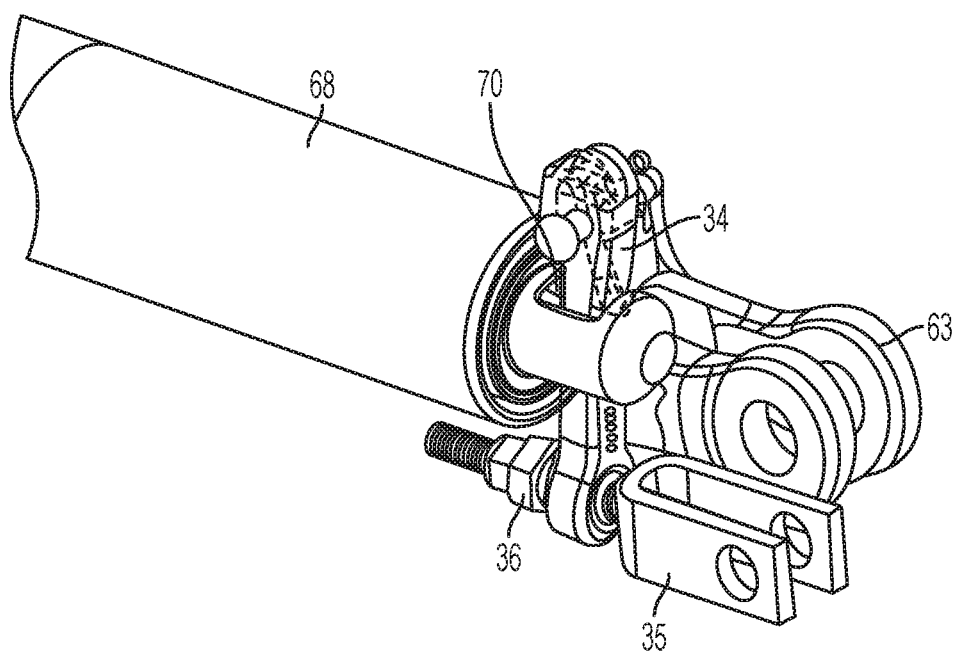
FIG. 3 is a partial perspective view of an internal trigger of a slack adjuster in accordance with the prior art.
Figure 4:
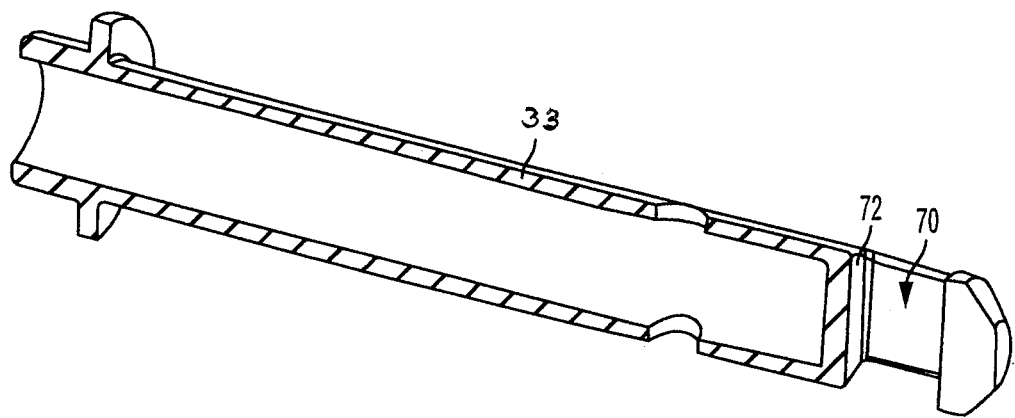
FIG. 4 is a partial cross-sectional perspective view of the overtravel control rod of the slack adjuster of FIGS. 2A and 2B in accordance with the prior art.

Reference is now made to FIG. 3, which shows a partial perspective view of the trigger 34 of FIG. 2A. Reference is also made to FIG. 4, which is a partial cross-sectional perspective view of the overtravel control rod 33 of the slack adjuster of FIGS. 2A and 2B. The trigger 34 of FIGS. 2A and 3 is an internal trigger of a slack adjuster 30 in accordance with the prior art. The trigger 34 extends through an opening 70 in the overtravel control rod 33. This design limits how far the main rod assembly 32 can retract into the slack adjuster 30 because the main rod assembly 32 has to stop short of the area in the overtravel control housing 68 at the location where the trigger 50 passes through on a solid stop 72 in the overtravel control rod 33.

Figure 5:
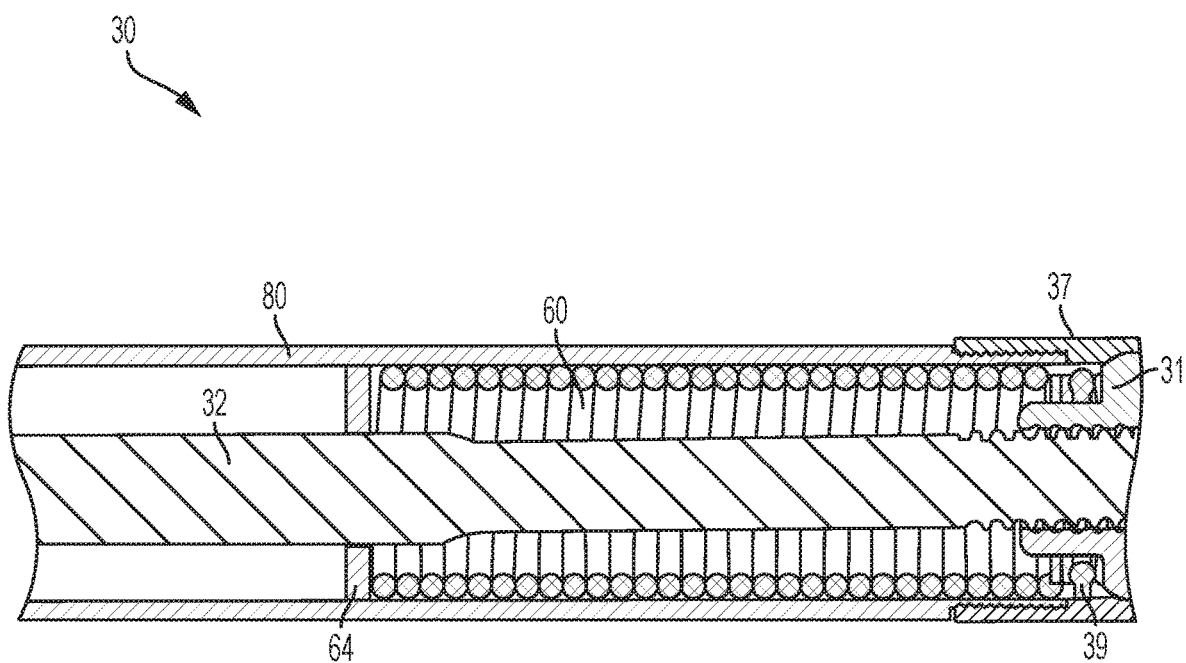
FIG. 5 is a partial cross-sectional view of the main spring housing portion of the slack adjuster of FIG. 2A in accordance with the prior art.

FIG. 5 shows a partial cross-sectional view of the main spring housing portion 80 of the slack adjuster 30 of FIG. 2A in accordance with the prior art. The main spring housing portion 80 includes a single main spring 60. This design is limited in its travel expansion whilst maintaining the required spring force to allow proper operation of the slack adjuster 30.

Figure 6:
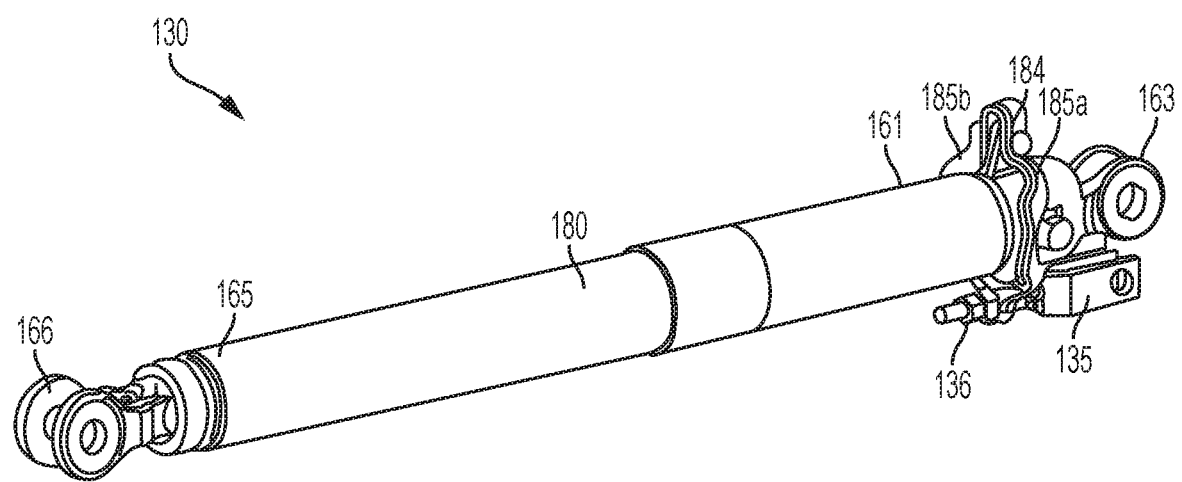
FIG. 6 is a perspective view of a slack adjuster in accordance with the invention.
Figure 7:
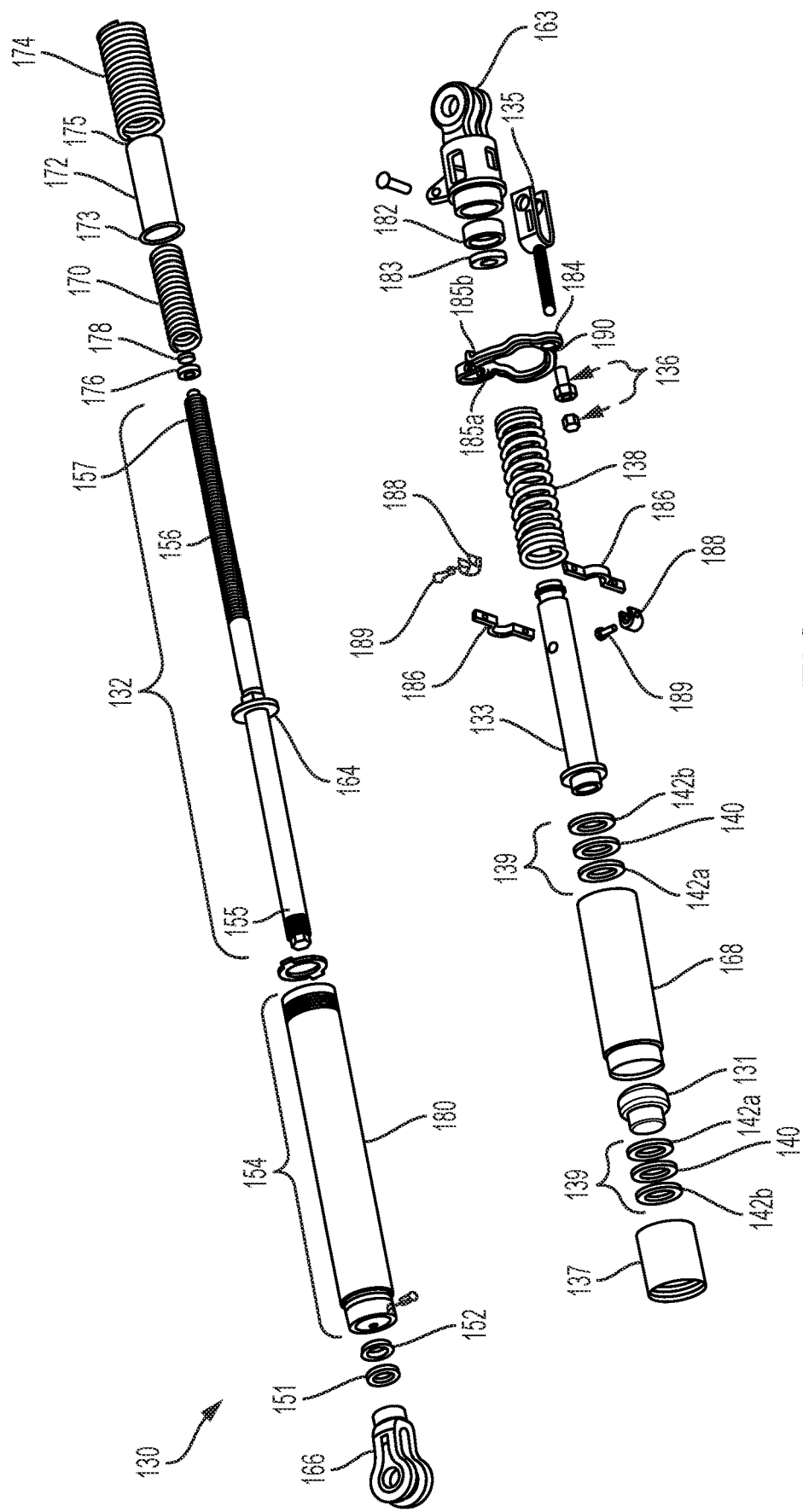
FIG. 7 is an expanded perspective view of the slack adjuster of FIG. 6 in accordance with the invention.
Figure 10:
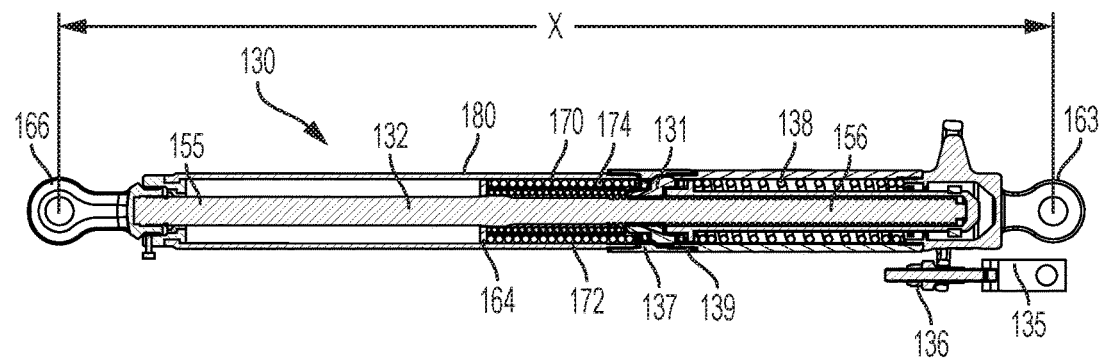
FIG. 10 is a cross-sectional view of the slack adjuster of FIG. 6 in a compressed condition and including a dual spring in accordance with the invention.

Reference is now made to FIGS. 6, 7, and 10, which show a slack adjuster, generally indicated as 130, in accordance with the invention. As stated above, one example of a current slack adjuster for truck mounted brake systems is typically effective for use with 2 inch (52 mm) brake shoes. The present invention is directed to a specially designed slack adjuster 130 that enables one to utilize thicker brake shoes, such as, for example, 3 inch (76 mm) brake shoes, within the same initial spatial envelope "X", in FIG. 10, as the prior art, shown in FIG. 2A, using 2 inch (52 mm) brake shoes. As discussed above with respect to the prior art slack adjuster, it can be appreciated that the slack adjuster 130 can have a compressed length or overall envelope size "X" that can vary depending upon the application and/or type of braking system being used. The envelope size of the present slack adjuster in the compressed condition can be defined by the following equation: $SA2_C=X$, where $SA2_C$ is the slack adjuster in the compressed condition of a second slack adjuster in accordance with the present invention; and X is the compressed length of the slack adjuster in accordance with the present invention. As stated above, the compressed envelope size "X" will be the same for both the slack adjuster of the prior art $SA1_C$ and the slack adjuster in accordance with the invention $SA2_C$ i.e., wherein $SA1_C=X=SA2_C$.

The combination of an external yoke trigger, as discussed in further detail below in regards to FIGS. 8 and 9, with a dual spring and canister assembly, as discussed in further detail below in regards to FIGS. 10-12, results in the slack adjuster 130 having an overall extended length or let-out length as denoted by "X+Z" in FIG. 13, where Z>Y and wherein this length Z is sufficient to be used with thicker brake shoes, such as 3 inch (76 mm) brake shoes or other brake shoe thickness, while maintaining the same spatial envelope "X" as shown in FIG. 2A. Accordingly, the length of the slack adjuster in the fully extended condition in accordance with the invention can be defined by the following equation $SA2_E=X+Z$, where $SA2_E$ is the length of the slack adjuster or the second slack adjuster in the fully extended position in accordance with the invention; X is the compressed length of the slack adjuster; and Z is the extension amount of the slack adjuster in accordance with the invention. This presently designed slack adjuster 130 can be used without the need for any manual adjustment or design changes to the interacting parts of the truck mounted braking system because the overall size "X" of the slack adjuster 130 remains the same.

Accordingly, the fully extended length of the slack adjuster in accordance with the invention can be defined by the following series of equations:

$$SA1_C=X;$$

$$SA1_E=X+Y;$$

$$SA2_C=X;$$

$$SA2_E=X+Z;$$

$$SA1_C=X=SA2_C; \text{ and } Z>Y$$

where, $SA1_C$ is the compressed length of the prior art or first slack adjuster;

$SA1_E$ is the fully extended length of the prior art or first slack adjuster;

X is the compressed length of both the first and second slack adjuster;

Y is the extension amount of the first slack adjuster;

$SA2_C$ is the compressed length of the slack adjuster or second slack adjuster in accordance with the invention;

$SA2_E$ is the fully extended length of the slack adjuster or second slack adjuster in accordance with the invention; and Z is the extension amount of the second slack adjuster in accordance with the invention.

With continuing reference to FIGS. 6 and 7, the slack adjuster 130 includes an elongated hollow cylindrical housing member 180 which is restrained against rotation and pivotally connectable at a first end 161 thereof, to the brake rigging with a front jaw 163 and pivotally connectable at a second end 165 thereof, to the brake rigging with a rear jaw 166. The second end 165 of the housing member 180 includes a main housing seal 151 and a polymer insert 152. The first end 161 of the housing member 180 also includes a control rod 135. The elongated cylindrical housing member 180 includes a main housing 154, a cone nut housing 137, and an overtravel housing 168. An elongated rod member or main rod 132 is positioned for reciprocal movement within the housing member 180 through the second end 165 of the housing member 180. The elongated rod member or main rod 132 is restrained against rotation and pivotally connectable at a first end 155 thereof, to the railway brake rigging by the rear jaw 166. The rod member has a threaded portion 156 adjacent a second end 157 that extends into the housing member 180 and through the second end 165 of the housing member 168.

With continuing reference to FIGS. 6 and 7, the slack adjuster 130 includes a critical operating area that includes the components of the slack adjuster 130 which operate together to adjust the brake rigging. One example of a critical operating area, includes a positioning member, such as a cone lock nut 131, that is located within the cone nut housing 137, and threadedly engaged with the threaded portion 156 of the elongated rod or main rod 132. The cone lock nut 131 is positioned between a pair of overtravel bearing assemblies 139. Each of the overtravel bearing assemblies comprise a ball bearing 140 sandwiched between an inner race 142*a* and an outer race 142*b*. The cone lock nut 131 rotates about the threaded portion 156 of the elongated rod or main rod 132 between respective first abutting engagement, disengagement, and second abutting engagement positions to change the length of the slack adjuster 130 by changing the relative longitudinal positions between the housing member 180 and the elongated rod or main rod 132.

Figure 11:
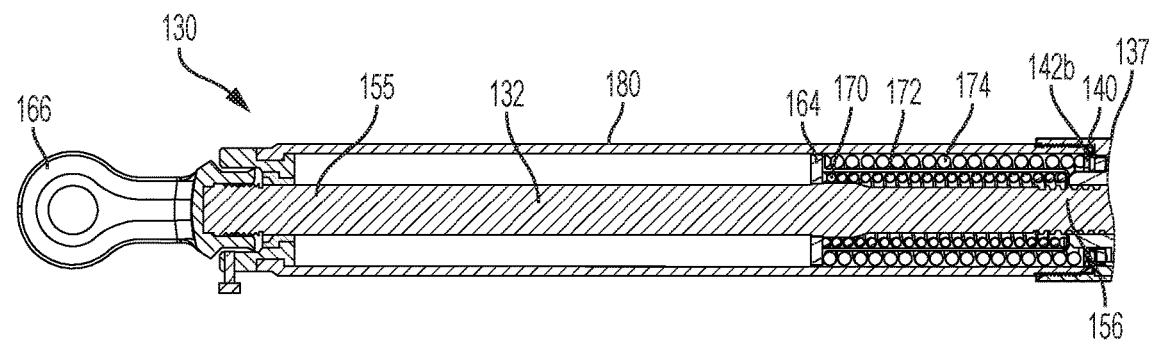
FIG. 11 is a partial cross-sectional view of the dual spring of FIG. 10 at a closed or compressed condition in accordance with the invention.
Figure 12:
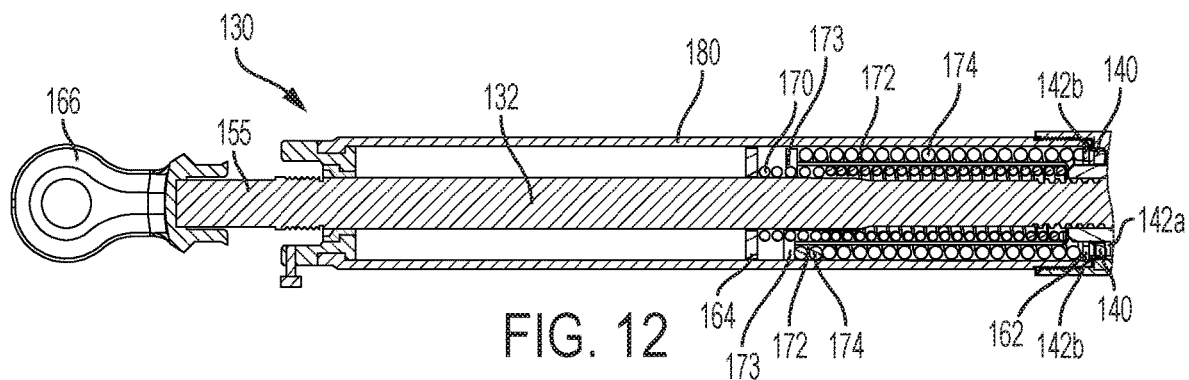
FIG. 12 is a partial cross-sectional view of the dual spring of FIG. 10 in a partially expanded condition in accordance with the invention.

As shown in FIG. 7 and discussed in further detail below with respect to FIGS. 10-12, the slack adjuster 130 also includes a first urging assembly which can include an inner spring 170, located within a spring cup or canister 172, and an outer spring 174 which abuts the overtravel spring seat 162, as shown in FIGS. 10-12, for urging the cone lock nut 131 into a first position, such as a disengaged position, with respect to the housing member 168. The inner spring 170 abuts a washer 164 and cooperates with a collet 176 and retaining ring 178.

With continuing reference to FIG. 7, a second urging assembly is also provided which, according to one embodiment, can include an overtravel spring 138 located within an overtravel housing 168. The overtravel spring 138 is stronger than the first urging assembly so as to overcome the force applied by the urging assembly and, therefore, urge the cone lock nut 131 into a second position. It can also be appreciated that other types of urging members, such as fluid operated cylinders may be used in place of the overtravel spring 138.

Figure 8:
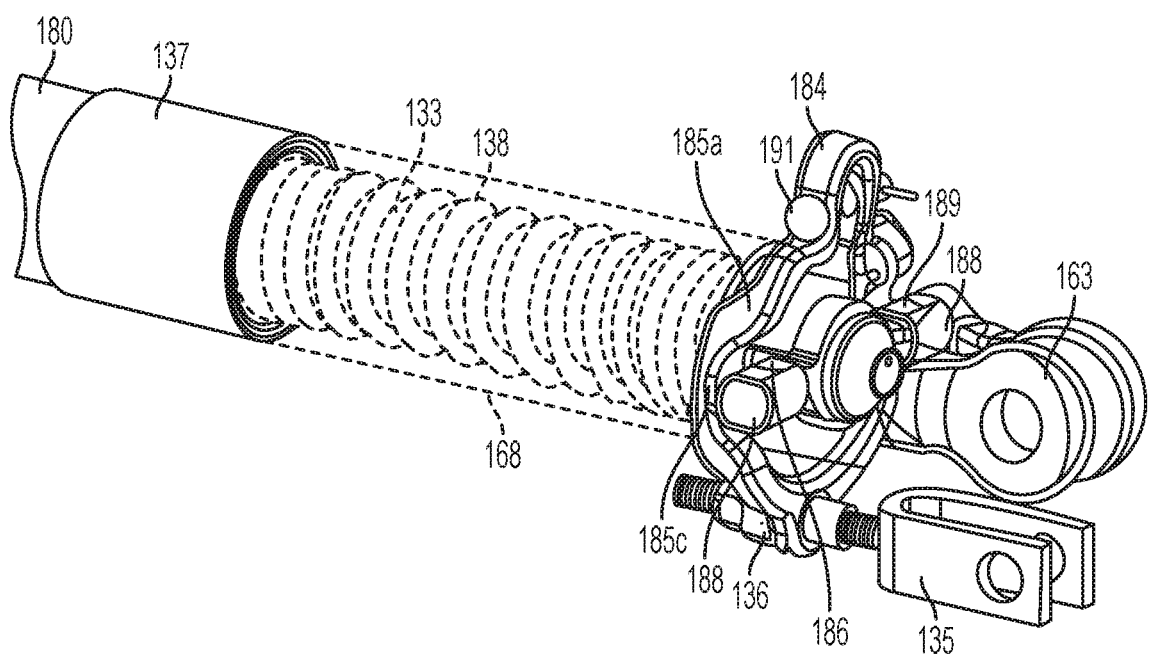
FIG. 8 is a partial cut-away perspective view of the external yoke trigger of the slack adjuster of FIG. 6 in accordance with the invention.
Figure 9:
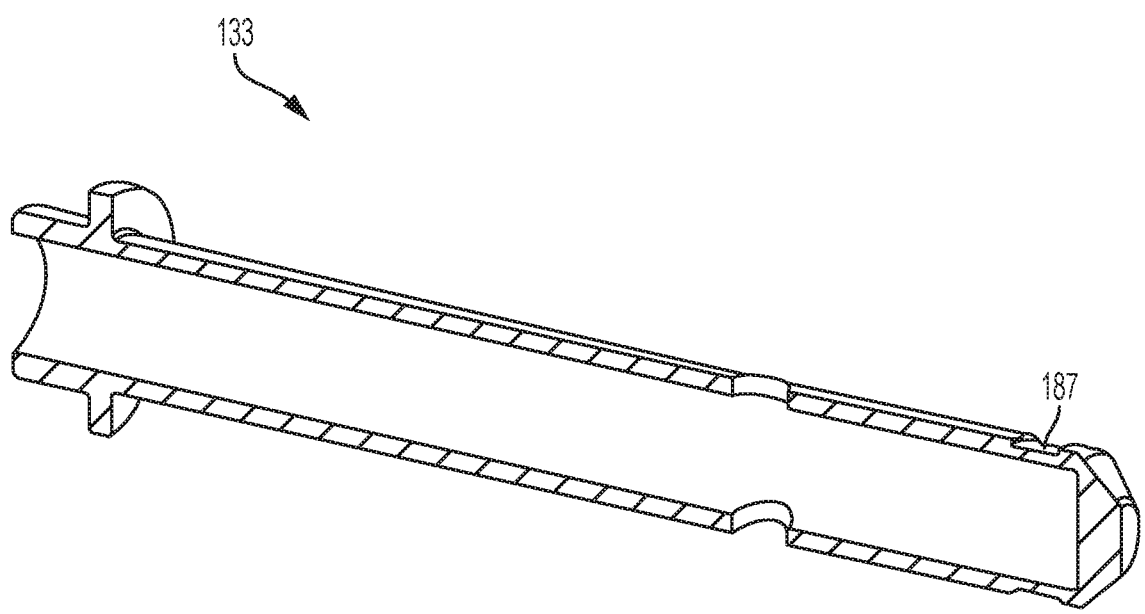
FIG. 9 is a partial cross-sectional perspective view of the overtravel housing portion of the slack adjuster of FIG. 6 for use with the external yoke trigger in accordance with the invention.

With continuing reference to FIGS. 6 and 7 and with further reference to FIG. 8, other components located at the front end of the slack adjuster 130 include a molded insert 182 and a wiper seal 183. Also located at the front end of the slack adjuster 130 is the external yoke trigger 184 in accordance with the present invention. The external yoke trigger 184 includes a pair of clamps 185*a*, 185*b* configured to grasp the overtravel control rod 133. The pair of clamps 185*a*, 185*b* are positioned about the overtravel control rod 133 and clamped in place via any well-known connecting member 191 such as a pin, rivet, screw, and the like. This design allows for the use of a hollow overtravel control rod 133, as shown in FIG. 9. A trigger ring 186 is positioned about a recessed portion 187 of the overtravel control rod 133. According to one embodiment, the trigger ring 186 can be a two-piece trigger ring that is joined together and about the overtravel control rod 133 via a pair of trigger studs 188 and rivets 189. The trigger studs 188 cooperate with the clamps 185*a*, 185*b* of the external yoke trigger 184 to hold the overtravel control rod 133 within the overtravel housing 168. The clamps 185*a*, 185*b* can include a recessed portion 185*c* configured to cooperate with the trigger studs 188. The trigger 184 is connected to the control rod 135 via an aperture 190 extending therethrough and a nut/hex locknut 136 arrangement. The hollow overtravel control rod 133 allows for the main rod 132 to retract further into the slack adjuster 130 and utilize more space within the same embodiment envelope. The external yoke trigger 184 also allows for a method to actuate the overtravel via the clamps 185*a*, 185*b*, which an internal type trigger would not be capable of doing. The external yoke trigger 184 allows the truck mounted brake system to work as originally designed while removing spatial constraints within the original embodiment of the slack adjuster.

Figure 13:
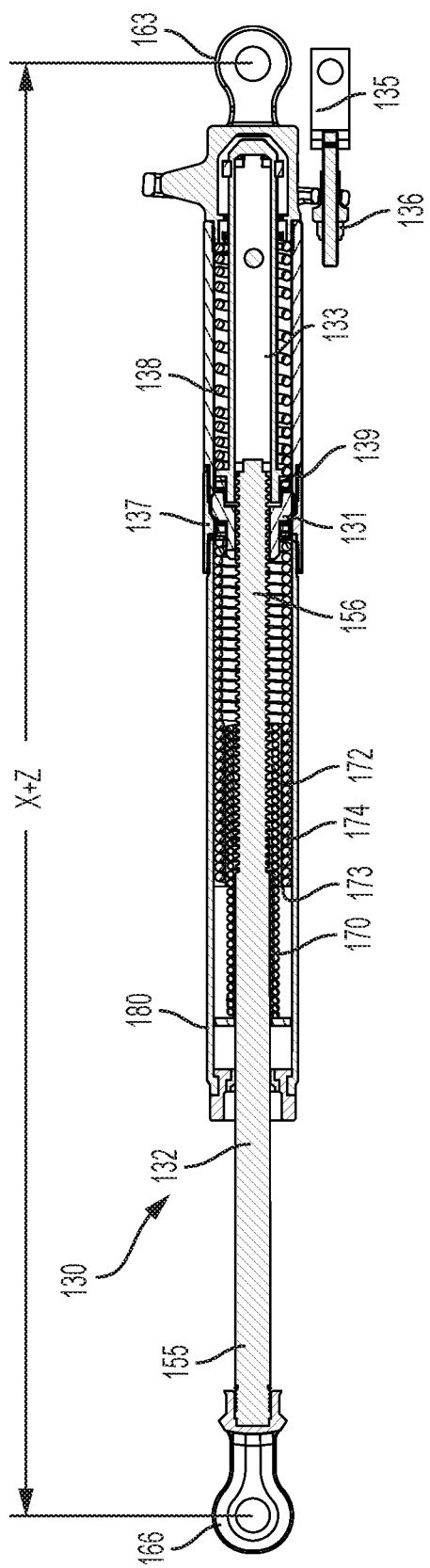
FIG. 13 is a cross-sectional view of the slack adjuster of FIG. 10 in a fully expanded condition in accordance with the invention.

Reference is now made to FIGS. 10-13, which illustrate the slack adjuster 130 including a dual spring and canister assembly in accordance with the invention. The use of dual springs in series separated by a spring cup or canister in a nesting arrangement makes it possible to preserve the required spring forces for operation, while allowing for greater expansion of the slack adjuster within the original envelope of the truck mounted braking system. Referring back to FIGS. 2A and 2B, a specific spring force balance is required between the main spring 60 and the overtravel spring 38 in order for the slack adjuster to function properly. However, the use of a single main spring 60 is limited in its travel/expansion whilst maintaining the required spring force to allow proper operation of the slack adjuster 30. The present invention utilizes an inner spring 170 and an outer spring 174 separated by a spring cup or canister 172. The spring cup or canister 172 includes a lip 173 that acts like a stop member for the outer spring 174 and a bottom cup portion 175 that functions as a stop member for the inner spring 170, which allows the springs 170, 174 to nest within one another. As shown in FIGS. 10 and 11, this nesting arrangement allows for compression of the springs 170, 174 to the same closed position as the single main spring 60, as illustrated in FIG. 2A. Referring now to FIGS. 12 and 13, the combination of the inner and outer springs 170, 174, along with the spring cup or canister 172, allows for a greater travel/expansion than the single main spring 60 while being able to maintain the spring force required for the slack adjuster 130 to function properly over a longer range of movement of the main rod 132. Additionally, the use of the nested spring arrangement, along with the external yoke trigger as described above, enables the slack adjuster 130 to fully extend to a length of "X+Z" as opposed to a length of "X+Y" of the prior art, wherein Z>Y, resulting in a greater overall extended length of the slack adjuster 130 which increases the let out capabilities of the slack adjuster 130 enabling the use of thicker brake shoes in the braking arrangement.

It can be appreciated that the slack adjuster can have both the external trigger and the dual spring and canister assembly, which allows one to maintain the same initial spatial envelope of the prior slack adjusters and, thus, does not require any change to the interacting components of the truck mounted brake system because the size of the slack adjuster remains unchanged. It can also be appreciated that the slack adjuster can include either one of the external trigger or the dual spring and canister assembly of the present disclosure, which would result in the capability of more let-out of the slack adjuster, but require a change to the overall size of the slack adjuster and consequently modification of the braking system. It can also be appreciated that one or both of the external trigger and dual spring and canister assembly can be used in order to achieve the desired let-out capabilities of the slack adjuster in order to accommodate a range of sizes of brake shoes within a variety of sized braking systems while maintaining a constant envelope size "X".

While various embodiments of the slack adjuster for use in a truck mounted brake system having greater let-out capabilities than previous designs were provided in the foregoing description, those skilled in the art may make modifications and alterations to these embodiments without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A method of retrofitting a braking system in order to increase the let-out length while maintaining a predetermined spatial envelope of the braking system, said method comprising: providing a slack adjuster having an overtravel housing, locating an overtravel control rod within the housing, and providing an external yoke trigger configured to cooperate with the overtravel control rod located within the overtravel housing, wherein the external yoke trigger comprises at least one clamp configured to encircle and grasp the overtravel control rod, and encircling a portion of the overtravel control rod with a trigger ring, wherein the trigger ring is positioned about a recessed portion of the overtravel control rod, the trigger ring cooperating with the external yoke trigger to secure the overtravel control rod within the slack adjuster, wherein the trigger ring comprises a two-piece trigger ring joined together and about the overtravel control rod via a pair of trigger studs and wherein the trigger studs cooperate with the at least one clamp to hold the overtravel control rod within the overtravel housing, and replacing a first slack adjuster having a compressed length of X and a fully extended length of X+Y with a second slack adjuster having the compressed length of X and a fully extended length of X+Z, and wherein Z>Y.

2. The method of claim 1, wherein the slack adjuster has a let-out length that is sufficient to accommodate the use of brake shoes having a thickness ≥2.01 inches.

3. The method of claim 1, wherein the slack adjuster includes an assembly comprising an inner spring and an outer spring separated by a canister, wherein the assembly is located within a main spring housing of the slack adjuster and wherein the inner spring and outer spring function in series and cooperate with the external yoke trigger to increase the slack adjuster let-out length.

4. A railway braking system comprising:
a pair of brake beams mounted at each end of the brake system, each of the brake beams including a compression beam, a tension beam, and a strut secured between the compression beam and tension beam;
a brake head attached to opposing terminal ends of each end of the brake beams, each of the brake heads carrying a brake shoe thereon, wherein each of the brake shoes are positioned for engagement with a respective railway vehicle wheel during a brake application;
a pair of force transfer members pivotally connected to the struts of the pair of brake beams;
a rod and a brake cylinder interconnecting a first end of the pair of force transfer members; and
a slack adjuster interconnecting a second end of the pair of force transfer members, wherein the slack adjuster includes:
an overtravel housing;
an overtravel control rod located within the housing; and
an external yoke trigger configured to cooperate with the overtravel control rod located within the overtravel housing, wherein the external yoke trigger comprises at least one clamp configured to encircle and grasp the overtravel control rod, and
a trigger ring encircling and positioned about a recessed portion of the overtravel control rod, the trigger ring cooperating with the external yoke trigger to secure the overtravel control rod within the slack adjuster, wherein the trigger ring comprises a two-piece trigger ring joined together and about the overtravel control rod via a pair of trigger studs and wherein the trigger studs cooperate with the at least one clamp to hold the overtravel control rod within the overtravel housing,
wherein the external yoke trigger increases a let-out length of the slack adjuster.

5. The railway braking system of claim 4, wherein the at least one clamp comprises a pair of clamps.

6. The railway braking system of claim 4, wherein the overtravel control rod is hollow from one end to an opposite end.

7. The railway braking system of claim 4, wherein the external yoke trigger is associated with a control rod and a control rod nut and wherein the overtravel control rod, external yoke trigger, control rod, and control rod nut cooperate together to measure an amount of let-out or take-up of slack for each brake application.

8. The railway braking system of claim 7, wherein the external yoke trigger is connected to the control rod via an aperture extending through a portion of the at least one clamp.

9. The railway braking system of claim 4, wherein the slack adjuster includes an assembly comprising an inner spring, a canister, and an outer spring located within a main spring housing of the slack adjuster, and wherein the assembly cooperates with the external yoke trigger to increase the let-out length of the slack adjuster.

10. The railway braking system of claim 9, wherein the inner spring nests within the outer spring such that the inner and outer spring function in series to increase a let-out length of a main rod of the slack adjuster.

11. The railway braking system of claim 4, wherein the slack adjuster has a let-out length that is sufficient to accommodate the use of brake shoes having a thickness ≥2.01 inches.

12. The railway braking system of claim 4, wherein the slack adjuster comprises a second slack adjuster that can be retrofitted into the braking system by replacing a first slack adjuster and wherein a fully extended length of the second slack adjuster is determined by the following equations:

$$SA1_C = X;$$

$$SA1_E = X+Y;$$

$$SA2_C = X;$$

$$SA2_E = X+Z;$$

$$SA1_C = X = SA2_C; \text{ and } Z>Y$$

where, $SA1_C$ is the compressed length of the first slack adjuster;
$SA1_E$ is the fully extended length of the first slack adjuster;

X is the compressed length of both of the first and second slack adjuster;

Y is the extension amount of the first slack adjuster;

$SA2_C$ is the compressed length of the second slack adjuster;

$SA2_E$ is the fully extended length of the second slack adjuster; and

Z is the extension amount of the second slack adjuster.

13. A method of retrofitting a braking system in order to increase the let-out length while maintaining a predetermined spatial envelope of the braking system, said method comprising: providing a slack adjuster having an overtravel housing, locating an overtravel control rod within the housing, and providing an external yoke trigger configured to cooperate with the overtravel control rod located within the overtravel housing, wherein the external yoke trigger comprises at least one clamp configured to encircle and grasp the overtravel control rod, and encircling a portion of the overtravel control rod with a trigger ring, wherein the trigger ring is positioned about a recessed portion of the overtravel control rod, the trigger ring cooperating with the external yoke trigger to secure the overtravel control rod within the slack adjuster, wherein the trigger ring comprises a two-piece trigger ring joined together and about the overtravel control rod via a pair of trigger studs and wherein the trigger studs cooperate with the at least one clamp to hold the overtravel control rod within the overtravel housing, connecting the external yoke trigger to a control rod via an aperture extending through a portion of the at least one clamp, and replacing a first slack adjuster having a compressed length of X and a fully extended length of X+Y with a second slack adjuster having the compressed length of X and a fully extended length of X+Z, and wherein Z>Y.

14. The method of claim 13, wherein the slack adjuster has a let-out length that is sufficient to accommodate the use of brake shoes having a thickness ≥2.01 inches.

15. The method of claim 13, wherein the slack adjuster includes an assembly comprising an inner spring and an outer spring separated by a canister, wherein the assembly is located within a main spring housing of the slack adjuster and wherein the inner spring and outer spring function in series and cooperate with the external yoke trigger to increase the slack adjuster let-out length.

* * * * *

UNITED STATES PATENT AND TRADEMARK OFFICE
CERTIFICATE OF CORRECTION

PATENT NO. : 10,562,550 B2
APPLICATION NO. : 15/241141
DATED : February 18, 2020
INVENTOR(S) : Michael Anthony Koziol, Scott Lee Natschke and Peter Paul Gregar It is certified that error appears in the above-identified patent and that said Letters Patent is hereby corrected as shown below:

In the Claims

In Claim 1 at Column 13, Line 18, delete "the" after "increase" add --a-- before "let-out"

In Claim 1 at Column 13, Line 21, add --overtravel-- before "housing"

In Claim 4 at Column 13, Line 51, delete "brake" after "system"" add --railway braking-- before "system"

In Claim 4 at Column 13, Line 52, add --pair of-- before "brake beams"

In Claim 4 at Column 13, Line 54, add --the-- before "tension"

In Claim 4 at Column 13, Line 56, delete "end" before "of" add --pair of-- before "brake beams"

In Claim 4 at Column 14, Line 2, add --over travel-- before "housing"

In Claim 7 at Column 14, Line 29, add --th-- before "external"

In Claim 7 at Column 14, Line 29, add --the-- before "control rod"

In Claim 7 at Column 14, Line 29, add --the-- before "control rod nut"

In Claim 13 at Column 15, Line 10, remove --the-- after "increase" add --a-- before "let-out"

In Claim 13 at Column 15, Line 13, add --overtravel-- before "housing"

Signed and Sealed this
Fifteenth Day of November, 2022

*Katherine Kelly Vidal*
*Director of the United States Patent and Trademark Office*